Jan. 20, 1959   E. T. WEBB ET AL   2,870,223
EXTRACTION PROCESSES
Filed April 11, 1955
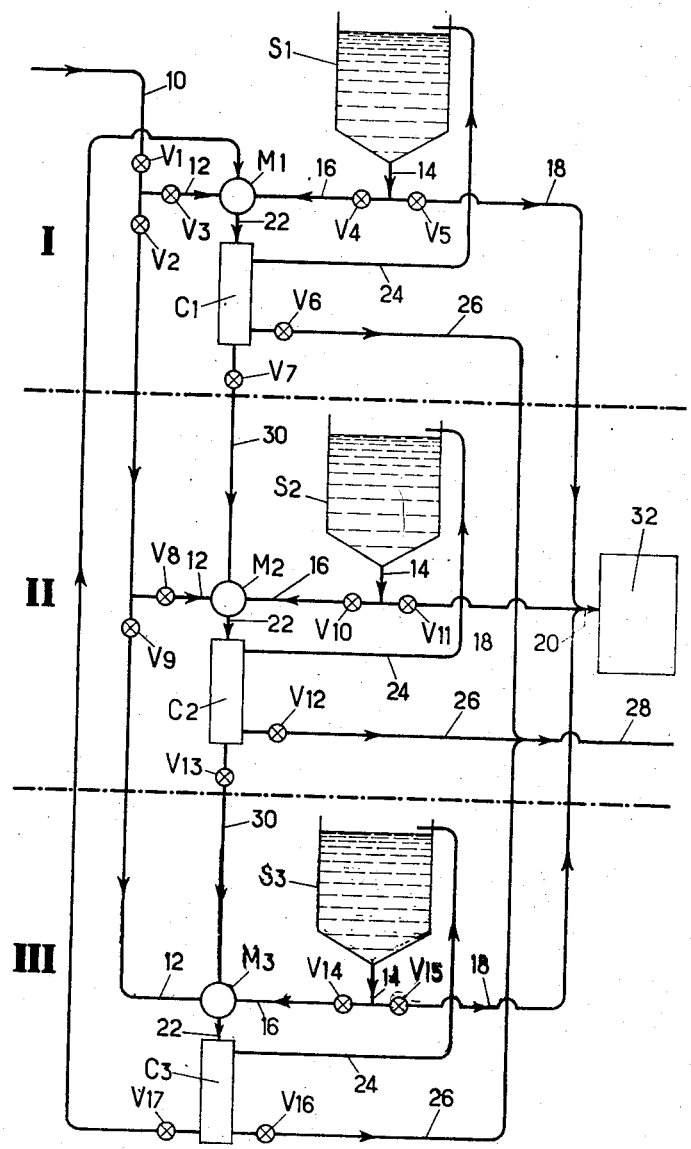
INVENTORS
Edwin T. Webb
John A. Seemuller
By Holcomb, Wetherill & Brisebois
ATTORNEYS

United States Patent Office 2,870,223
Patented Jan. 20, 1959

2,870,223
EXTRACTION PROCESSES

Edwin Thomas Webb, Torwoodlee, Hatch End, England, and John Robert Seemuller, Maisons-Laffitte, France, assignors to Societe Anonyme Union Francaise Commerciale et Industrielle, Casablanca, Morocco, a corporation of Morocco Application April 11, 1955, Serial No. 500,608

Claims priority, application Great Britain April 13, 1954

7 Claims. (Cl. 260—637)

This invention relates to solvent extraction processes. Such processes are used both for the recovery of valuable products from mixtures or solutions and for the purification of mixtures or solutions by the removal of one or more of their constituents. In either case, the most common form of process is the so-called "countercurrent" process in which the stock to be treated and the solvent are caused to pass in opposite directions through a tower or the like in which the extraction is effected in a number of stages. In each stage the stock and solvent are brought together and are then separated into solvent enriched in the constituent to be removed from the stock and stock from which a proportion of that constituent has been removed. The enriched solvent is passed to an earlier stage where it meets richer stock and the impoverished stock is passed to a later stage where it meets less rich solvent. Thus, as the stock passes through the tower, it becomes progressively impoverished while as the solvent passes through the tower in the opposite direction it becomes progressively enriched in the constituent to be extracted. As the solvent becomes progressively enriched, it becomes progressively less capable of extracting the constituent in question from the stock.

The object of the invention is to obtain a greater extraction by the use of a given amount of solvent than is possible with the countercurrent process.

In a solvent extraction process, when the solvent contains a certain proportion of the product to be extracted it is withdrawn from the process as bringing it into contact with further amounts of stock becomes uneconomical or even useless. By the time a given volume of solvent has been withdrawn, it will have been brought into contact with a given volume of stock. The ratio of those two volumes can be called the "overall extraction ratio." It is a constant for any process provided, of course, that the composition of the stock and the solvent which are fed to the extraction plant remain constant and the operating conditions in the plant remain constant. The relative rates of feed of the solvent and the stock must remain constant and the ratio of those rates is strictly equal to the overall extraction ratio. Expressed another way, the ratio of the proportions in which solvent and stock are mixed at any moment and at any point along the path of flow is, in principle, equal to the overall extraction ratio.

The fundamental idea underlying the invention is to increase the ratio of the proportions in which the solvent and stock are mixed without increasing the overall extraction ratio.

In the solvent extraction process in accordance with the invention, the stock is treated in a number of successive stages with a different batch of solvent in each stage, the solvent in each stage being progressively enriched to a predetermined concentration of the constituent to be extracted from the stock and then being withdrawn from the system and the enrichment of the solvent being effected by repeatedly mixing the solvent with the stock, as the latter passes through the stage, in a proportion such that the ratio by volume of solvent to stock in the mixture is substantially greater than the overall extraction ratio i. e. the ratio by volume of total amount of solvent withdrawn to the amount of stock passed through the various stages to bring the solvent to the said predetermined concentration.

We have found that by operating in this manner, we are able to obtain substantially greater yields of valuable products than with the countercurrent process in spite of using fewer stages and with smaller amounts of solvent. Particular examples of fields in which we have been highly successful are the recovery of glycerol from soap stocks and the extraction of thioglycolic acid from complex aqueous solutions thereof. The process is, however, of general application to the solvent extraction of constituents of any mixture or solution which is liquid or can be caused to flow.

A further advantage of the invention is that it involves the provision of only simple plant as will be appreciated from the following description of the accompanying drawing in which an example of the invention is shown diagrammatically in the form of a flow sheet.

The plant shown in the drawing provides three extraction stages I, II, III in each of which there is a solvent tank $S_1$, $S_2$ or $S_3$, a mixer $M_1$, $M_2$ or $M_3$ and a centrifuge $C_1$, $C_2$ or $C_3$.

The stock to be treated enters the plant from a source not shown through a pipe 10 having branches 12 to each of the three mixers $M_1$, $M_2$, $M_3$.

Each solvent tank $S_1$, $S_2$, $S_3$ has an outlet pipe 14 having branches 16 to each of the three mixers $M_1$, $M_2$, $M_3$ and branches 18 to a common evacuation pipe 20.

Each mixer $M_1$, $M_2$, $M_3$ is connected by an outlet pipe 22 to one of the centrifuges $C_1$, $C_2$, $C_3$.

Each centrifuge $C_1$, $C_2$, $C_3$ has an outlet pipe 24 leading from its upper part to the associated solvent tank $S_1$, $S_2$, $S_3$ and an outlet pipe 26 leading from its lower part to a common evacuation pipe 28. Each centrifuge is also connected to the mixer in the next stage by a pipe 30.

The direction of flow through the various pipes is indicated by arrows. The path of flow of the stock and the solvent is governed by the setting of the various valves $V_1$–$V_{17}$.

The mixers are of a known kind capable of mixing together two liquids in controlled proportions and delivering the mixture at a controlled rate.

It will be assumed that the plant is in operation and that the fresh stock, which for the purposes of this example will be assumed to be newly saponified soap stock, is being delivered by the pipe 10 to the mixer $M_2$ in the second stage, the valves being set so that the path of flow of the soap stock is:

Pipe 10, past valves $V_1$, $V_2$, $V_8$ to mixer $M_2$, centrifuge $C_2$, past valve $V_{13}$ to mixer $M_3$, centrifuge $C_3$, past valve $V_{17}$, pipe 30, to mixer $M_1$, centrifuge $C_1$, past valve $V_6$ to pipe 26 and out through evacuation pipe 28.

The solvent (which for the purposes of this example will be assumed to be brine) in the tank $S_1$ will be assumed to be fresh solvent, i. e. brine which has been newly put into the plant and which has not yet removed any glycerol from the soap stock—removal of glycerol being the aim and object of the process. The solvent in the tank $S_3$ is partly charged, i. e. it is brine which has already been used to remove some glycerol from the soap stock. The solvent in the tank $S_2$ is also partly charged with glycerol but to a higher concentration than the brine in the tank $S_3$.

The path of the brine from the tank $S_1$ is: tank $S_1$, pipe 14, past valve $V_4$ to pipe 16, mixer $M_1$, centrifuge $C_1$, pipe 24 and back to tank $S_1$.

The path of the brine from the tank $S_2$ is: tank $S_2$, pipe 14, past valve $V_{10}$ to pipe 16, mixer $M_2$, centrifuge $C_2$, pipe 24 and back to tank $S_2$.

The path of the brine from the tank $S_3$ is: tank $S_3$, pipe 14, past valve $V_{14}$ to pipe 16, mixer $M_3$, centrifuge $C_3$, pipe 24 and back to tank $S_3$.

It will be seen that the soap stock passes through the three stages in succession—in this case in the order II, III, I—and is treated in each stage with a different batch of brine, the condition of the brine being different in each stage.

The soap stock which enters the stage II has a high glycerol content; that which enters stage III has a lower glycerol content, some of the glycerol having been removed by the brine in stage II; that which enters the stage I has a still lower glycerol content. As already indicated, the glycerol content of the brine is lowest in stage I and highest in stage II. In other words, as the soap passes from stage to stage, its glycerol content decreases and it meets brine of decreasing glycerol content. In this respect, the same conditions are maintained as exist in the conventional countercurrent washing process.

The process is, however, radically different from the countercurrent process. In the latter process, at any point and at any moment, a given amount of stock is mixed with an amount of solvent which is determined by and, in principle, is equal to the "overall extraction ratio," i. e. the ratio of the total amount of solvent and the total amount of stock which are circulated through the plant in a given time. In the process in accordance with the invention, at any moment in any of tre mixers a given amount of stock is mixed with an amount of solvent which is much higher than that determined by the overall extraction ratio.

The soap stock which enters the mixer $M_2$ is fed thereto at a controlled rate and it meets therein brine from the tank $S_2$ which is also fed at a controlled rate. The soap stock passes to the mixers $M_3$ and $M_1$ at the same rate as it is fed to the mixer $M_2$ but the solvent can be passed to the mixers at any desired rates. For the purpose of this example, it will be assumed that the solvent is passed to the various mixers at the same rate.

The mixture which leaves the mixer $M_2$ consists of soap stock and brine, the brine containing some of the glycerol which was originally in the stock. The glycerol content of the soap stock is reduced while that of the brine is increased, the decrease and increase being determined by the original difference in glycerol contents of the stock and the brine and the ratio in which the stock and the brine are mixed in each stage.

In the centrifuge $C_2$, the brine enriched in glycerol is separated from the stock impoverished in glycerol. The enriched brine is passed back to the tank $S_2$ the brine in which acquires an increasing glycerol content as the process progresses. It is to be noted, however, that the brine which passes from the tank $S_2$ to the mixer is of lower glycerol concentration than that which is returned to the tank. This condition will obtain until the glycerol content of brine and stock are such that a state of equilibrium occurs at which there can be no further extraction by the solvent. However, for reasons of economy, one does not continue the operation until the state of equilibrium is reached. One stops when the glycerol concentration of the brine has reached a pre-determined level.

The improverished soap stock which leaves the bottom of the centrifuge $C_2$ passes to the mixer $M_3$ in stage III where it meets brine from the tank $S_3$ under the same conditions as in stage II. Here, however, the brine has a lower glycerol concentration than that in stage II. Consequently, there will be a further extraction of glycerol from the stock. As in stage II, the process could be allowed to continue until a stage of equilibrium is reached but, in practice, it is stopped earlier.

The further impoverished soap stock then leaves stage III, passing out through the bottom of the centrifuge $C_3$, to the mixer $M_1$ of stage I where it meets brine of still lower glycerol concentration from the tank $S_1$. Once again, therefore, there will be further extraction of glycerol.

After passing through the three stages, the soap stock passes out of the plant from the centrifuge $C_1$ through the outlet 28.

The result of the process so far is that the brine in all three tanks is now charged with glycerol, that in the tank $S_2$ being of highest concentration and that in the tank $S_1$ of lowest concentration.

At this point, the process is stopped. The valve $V_{10}$ in stage II is closed and the valve $V_{11}$ opened so that the brine in the tank $S_2$ is evacuated through the pipe 20 to a glycerol recovery plant indicated at 32. The tank $S_2$ is then charged with fresh brine and the valves $V_{10}$ and $V_{11}$ restored to their previous settings. Also, the valve $V_8$ is closed, the valve $V_6$ closed and the valve $V_7$ opened so that the soap stock passes directly to the mixer $M_3$ in stage III and then to the mixers $M_1$ and $M_2$ in stages I and II. The valve $V_{13}$ is closed and the valve $V_{12}$ opened so that on leaving the centrifuge $C_2$, the soap stock passes out of the plant by the pipe 28.

The process is then restarted, the soap being treated in stages III, I and II under the same conditions as previously obtained in stages II, III and I.

When the brine in the tank $S_3$ has reached the desired high glycerol concentration, the process is stopped again and by appropriate setting of the various valves, the tank $S_3$ is discharged through the pipe 20 to the glycerol recovery plant 32 and the soap stock is directed from the pipe 10 through the three stages in the order I, II, III.

This procedure is repeated cyclically as and when the glycerol content of the brine in the various tanks $S_1$, $S_2$, $S_3$ reaches the desired high glycerol concentration. As already indicated, the various runs need not be continued until a state of equilibrium is reached between the glycerol concentrations of soap stock and brine in the various stages. The point at which the change is made is determined according to considerations of general economy. The number of stages is not critical. As many can be provided as are useful to obtain the desired recovery of glycerol in the most economical manner.

In one complete cycle, each of the three tanks $S_1$, $S_2$ and $S_3$ is discharged once. The amount of solvent (brine) which is used for extraction purposes in one complete cycle is the sum of the three amounts with which the three tanks $S_1$, $S_2$, $S_3$ are charged. The ratio of that amount to the amount of stock which passes through the plant in one complete cycle is what has been called above the "overall extraction ratio." The solvent, however, is used over and over again in each stage and the total volume of brine which is brought into contact with the soap during the complete cycle is much greater than the total volume of brine which is charged into the three tanks. The ratio of brine to soap stock at the moment of mixing is much greater than the overall extraction ratio and it is that feature which leads to the benefits which are to be obtained from the invention. The higher the ratio of brine to stock at the time of mixing, the greater is the recovery of glycerol for a given number of extraction stages. In general, the mixing ratio should be not less than twice nor more than twenty times the overall extraction ratio. That range may, however, be exceeded in special cases.

We have been able, by means of this process, to obtain a glycerol recovery from soap stock well in excess of that obtainable by the conventional countercurrent brine washing process using the same amount of solvent (brine).

The salt concentration of the brine must be high enough to preclude any substantial dissolution of soap in it. The higher the concentration, the less readily will the soap settle out of the brine. Where brine of a high concentration is used, it is advisable, as in the example described above, to separate the soap from the brine centrifugally. Where, however, brine is used which is of a concentration only just high enough to preclude dissolution of soap, the mixture which leaves the mixers in the various stages can be settled by gravity.

It is advisable also to ensure that the glycerol-charged brine which is returned to the solvent tanks be delivered thereto in such a manner that it will not immediately be fed back to the mixer. This can be contrived by providing the tank with a baffle which divides it into two compartments—one for receiving returned brine and the other for delivering brine to the mixer, brine being withdrawn from the two compartments alternately as and when they become respectively full and empty.

The invention has been described in some detail in relation to the recovery of glycerol from soap stock only by way of example. That is by no means its only application, nor indeed its principal application. We have been particularly successful in using it for the extraction of thioglycolic acid from an aqueous solution thereof containing also various salts. The process which we have used is precisely similar to that described above, the said solution being the stock which is passed successively through the various stages and the solvent which is circulated in each stage being methylisobutylketone. With a volume of solvent about half the volume of stock containing about 100 grams of thioglycolic acid per litre, we have been able to recover considerably more thioglycolic acid in two extraction stages than can be obtained in four stages of conventional counter-current extraction with the same amount of solvent.

The invention finds many applications in the petroleum industry. It can be used, for example, for sweetening petrol by means of a solvent such as aqueous caustic soda, lead sulphide or a solutiser solution; for the purification of lubricating oil by means of a solvent such as phenol, furfural or methylethylketone; for deasphalting or dewaxing lubricating oils by means of a solvent such as petrol or gasoline; for improving kerosine and jet fuels by solvent extraction with liquid sulphur dioxide.

The process can be used for the solvent extraction of the most diverse substances whether it be a question of recovering a valuable product such as glycerol or thioglycolic acid or of removing an undesirable constituent from a solution or mixture. The stock which is treated need not be liquid as long as it can be made to flow. For example, a stock consisting of crushed oil seeds in which solid matter is mixed with a liquid can be treated by the process of the invention for the recovery of the oil by means of a solvent such as trichlorethylene.

One of the great advantages of the invention lies in the simplicity of the process and of the plant required to operate it. The plant can be built entirely from readily available articles of commerce.

The process can be used economically whether the volume of stock to be treated is small or large. In a typical large soap plant, the stock might be passed through the plant at a rate of say 2500 kg. an hour and each solvent tank contain 10 tons of 10% brine.

We claim:

1. A process of extracting a constituent from a stock liquid with a solvent in which the stock to be treated flows through a system comprising a number of successive stages, each stage utilizing a separate batch of said solvent, said batches being of progressively lower concentration in the constituent to be extracted, the stock being introduced into a first stage where the concentration of said constituent in said solvent is maximum and being withdrawn from a last stage in which said concentration is minimum, said stock being mixed with said solvent in a separate mixing zone in each stage to enrich said solvent and then separated from the enriched solvent and led to the next stage, fresh stock being added to the first stage and impoverished stock being withdrawn from the last stage, while the separated solvent of each stage is recycled within the same stage until its concentration of constituent has attained a predetermined value, the introduction of said stock into said first stage and the flow of said stock and solvent in all said stages being simultaneously interrupted when said predetermined concentration value is attained in said first stage, the solvent of said first stage being then withdrawn and replaced by fresh solvent, after which the flow of said stock and solvent is resumed, said stock being then introduced into the one of said stages which followed said first stage and said treated stock being withdrawn from said first stage, which becomes the last stage through which the stock flows, the ratio by volume of solvent to stock in the mixing zone of each stage being kept substantially greater than the overall ratio by volume of solvent withdrawn from the system to stock withdrawn from the system.

2. A solvent extraction process according to claim 1 in which the mixing ratio is from 2 to 20 times the overall extraction ratio.

3. A solvent extraction process according to claim 1 in which different mixing ratios are used in different stages.

4. A solvent extraction process according to claim 1 in which the separation of the enriched solvent from the impoverished stock is effected centrifugally.

5. A solvent extraction process according to claim 1 in which the separation of the enriched solvent from the impoverished stock is effected by gravity.

6. A process according to claim 1 for the recovery of glycerol from newly saponified soap stock in which the solvent is brine of a salt concentration high enough to preclude dissolution of soap in it.

7. A process according to claim 6 in which the salt concentration of the brine is close to the minimum below which dissolution of soap can occur.

References Cited in the file of this patent

UNITED STATES PATENTS

| | | |
|---|---|---|
| 2,425,224 | Bearse | Aug. 5, 1947 |
| 2,479,041 | Elgin | Aug. 16, 1949 |
| 2,776,305 | Habicht | Jan. 1, 1957 |

FOREIGN PATENTS

| | | |
|---|---|---|
| 108,236 | Australia | Aug. 9, 1939 |